United States Patent [19]

Fochtman et al.

[11] Patent Number: 4,977,839

[45] Date of Patent: Dec. 18, 1990

[54] PROCESS AND APPARATUS FOR SEPARATING ORGANIC CONTAMINANTS FROM CONTAMINATED INERT MATERIALS

[75] Inventors: Edward G. Fochtman, Elmhurse; Peter S. Daley, Glen Ellyn; Milton Ader, Park Forest; Albert G. Plys, South Holland; Carl P. Swanstrom, Naperville, all of Ill.; James F. Grutsch, Hammond, Ind.

[73] Assignee: Chemical Waste Management, Inc., Oak Brook, Ill.

[21] Appl. No.: 360,365

[22] Filed: Jun. 2, 1989

Related U.S. Application Data

[63] Continuation-in-part of Ser. No. 143,891, Jan. 14, 1988, Pat. No. 4,864,942.

[51] Int. Cl.⁵ .............................................. F23G 5/12
[52] U.S. Cl. ...................................... 110/346; 48/209; 110/226; 110/229; 110/230
[58] Field of Search .............. 110/226, 229, 230, 346, 110/246; 48/209

[56] References Cited

U.S. PATENT DOCUMENTS

| | | | |
|---|---|---|---|
| 3,536,457 | 10/1970 | Henderson | 126/21 R |
| 3,954,069 | 5/1976 | Loken | 110/226 X |
| 4,301,750 | 11/1981 | Fio Rito et al. | 110/226 X |
| 4,615,283 | 10/1986 | Ciliberti et al. | 110/210 X |
| 4,738,206 | 4/1988 | Noland | 110/346 |
| 4,827,854 | 5/1989 | Collette | 110/226 X |
| 4,840,129 | 6/1989 | Jelinek | 110/229 |

FOREIGN PATENT DOCUMENTS

2724271 12/1978 Fed. Rep. of Germany.
3216771 12/1982 Fed. Rep. of Germany.
147705 5/1979 Norway.

OTHER PUBLICATIONS

Webster, David M., "Enclosed Thermal Soil Aeration for Removal of Volatile Organic Contamination", *Journal of the Air Pollution Control Assoc.*, vol. 36, No. 10, (Oct. 1986), pp. 1156–1163.

"Soil Aeration Pilot Study Work Plan", *Canonie Engineers*, Project CH 84—130, (Oct. 1985).

"A Guide to Innovative Thermal Hazardous Waste Treatment Processes", *The Hazardous Waste Consultant*, May/Jun. 1986, pp. 4—1—2, 4—7, 4—8, 4—38, and 4—39.

Newsome, A., "Subject: Andre Marsan & Associates Inc., Montreal", May 19, 1983, *C. E. Raymond Interoffice Correspondence*, (Memo to File) (cc: D. Dahlstrom).

*Primary Examiner*—Edward G. Favors
*Attorney, Agent, or Firm*—Allegretti & Witcoff, Ltd.

[57] ABSTRACT

A method for economically separating chemical contaminants such as volatile organic chemicals (VOC's) and polychlorinated biphenyls (PCB's), even if the contaminants are present at low concentrations, from inert materials such as soils or sludges, comprising subjecting inert materials contaminated with chemical compounds to a temperature effective to volatilize the contaminants but below incineration temperature, with continuous removal of evolved vapors, for a period of time sufficient to effect the desire degree of separation of contaminants. The evolved vapors may be subjected to catalytic oxidation to destroy the volatilized chemical compounds.

25 Claims, 6 Drawing Sheets

PROCESS AND APPARATUS FOR SEPARATING ORGANIC CONTAMINANTS FROM CONTAMINATED INERT MATERIALS

CROSS-REFERENCE TO RELATED APPLICATION

This application is a continuation-in-part of co-pending application Ser. No. 143,891, filed Jan. 14, 1988, U.S. Pat. No. 4,864,942 the contents of which are incorporated herein by reference thereto.

FIELD OF THE INVENTION

The invention concerns an economical process for decontaminating inert materials contaminated with chemical compounds. More particularly, the invention concerns a process and apparatus for thermally separating chemical contaminants such as volatile organic chemicals (VOC's) and polychlorinated biphenyls (PCB's), even if the contaminants are present at low concentrations, from inert materials such as soils or sludges, leaving decontaminated inert materials. The removed contaminants may be condensed and collected for further treatment, or subjected to a catalytic oxidation treatment.

BACKGROUND OF THE INVENTION

Highly halogenated organic chemicals are favored in industry due to their many useful properties, such as stability under heat and pressure. However, these chemicals are sometimes toxic to flora and fauna. Improper disposal or spills of these organic chemicals may contaminate the environment. Cleanup is necessary due to the considerable health hazard and environmental stability of these chemicals.

In the past, an acceptable procedure for cleaning up a contaminated area involved removal of the contaminated soil or material to a designated secure landfill. Due to recent and upcoming federal regulations, the types and amounts of organic materials that can be disposed of in such a designated landfill have been greatly reduced. Therefore, there is a growing need to sanitize soils with an efficient and economical treatment process.

At present, the only generally accepted treatment technology for destroying highly halogenated organic contaminants is incineration. Application of incineration to soil treatment is inefficient because the contaminants to be incinerated are adhered to a large mass of inert material. In treating soil, incineration would involve collecting, packaging and transporting a large mass of contaminated material to a licensed incineration facility, heating the large mass of inert solids to very high incineration temperatures to decompose the proportionately small amount of target contaminants, and packaging and returning the materials back to the treatment site from where they were removed, or disposed of in a secure landfill.

In addition to the labor cost, the transportation cost, and the energy cost there is also a problem in that the capacity of present licensed incineration facilities is currently limited. Further, during incineration some of the halogenated contaminants may be converted to dioxin which is approximately 10,000 times as carcinogenic as an equal amount of PCB; thus special precautions must be implemented to prevent release into the atmosphere of this highly toxic by-product.

A similar process to incineration for the disposal or cleanup of contaminated wastes is pyrolysis. Such a process is disclosed in U.S. Pat. No. 4,301,750 (Fio Rito et al.), where waste materials, such as wood waste from lumber mills, are pyrolyzed in a rotating dryer. This pyrolysis process is operated at temperatures on the order of 3,000° to 4,000° F.

As an alternative to incineration and pyrolysis, chemical processes have been developed for decontamination of contaminated soil, which basically involve treatment with a desorbent and dehalogenating agent. An example of such a chemical treatment is provided in U.S. Pat. No. 4,574,013 (Peterson). A typical reaction scheme involves concurrently reacting an alkali metal hydroxide with an alcohol to form an alkoxide and water; reacting the alkoxide with the unwanted halogenated aromatic contaminant to form an ether and a salt; permitting the ether to decompose to a phenol; and reacting the phenol with an alkoxide to form a water soluble phenate.

In such a chemical process the presence of water interferes with the chemical reaction scheme, thus the contaminated soil is preferably preliminarily dried to remove water. Drying involves removal of water, leaving dry contaminated soil. After the water has been removed, the soil is treated with the reagent and the chemical reaction is carried out in a basically sealed system. To accelerate the reaction, the contaminated soil may be mixed with the reagent in a cement mixer or similar device, with optional increase in temperature and pressure.

Similarly, U.S. Pat. No. 4,327,027 (Howard) discloses dehalogenation of halogenated aromatic compounds including PCB using anhydrous alkali metal salts of alcohols, preferably polyhydroxy alcohols. This reaction is also preferably carried out in an absence of moisture in a closed system.

Another dehalogenation technique is exemplified by U.S. Pat. No. 4,144,152 (Kitchens). Halogenated compounds, particularly PCB, are dehalogenated by photodegradation with UV radiation. The treatment method may be adapted to decontamination of soil by first washing the soil with a UV transparent carrier, such as an organic solvent, preferably methanol rendered alkaline by the addition of an alkali metal oxide or hydroxide, and then irradiating the UV transparent carrier containing the contaminant.

However, in the case where relatively small amounts of contaminants are adsorbed to large amounts of inert materials such as soil or sludge, each of the above techniques involves considerable expense and inconvenience. Transportation and energy costs are involved in conveying soil to an incineration facility and heating the large mass to incineration temperatures. The chemical treatment techniques are slow and may take weeks if not accelerated by increasing pressure or temperature, and involve the expense of start-up and expended chemicals for treating soil to desorb and dehalogenate contaminants.

Accordingly, a keen need has been felt for a more efficient, economical system and apparatus for separating contaminants from contaminated soil, sludge and other inert materials. There is also a need for a system that is adaptable to being transportable to a contaminated area.

OBJECTIVES

An object of the present invention is to provide a process and apparatus capable of simply and efficiently separating contaminants from soils and sludges. Such a system must be capable of accepting a wide variety of contaminated feed materials and economically separating the contaminants from the inert material in a closed system so that there is no release of contaminants into the atmosphere.

Another objective is to provide a thermal separation process that operates at temperatures at which undesirable chemical reactions, such as the formation and evolution of dioxin as a by-product, do not occur.

Yet another object of the present invention is to develop a process that can economically and safely sanitize inert materials to a high degree.

Still another object is to provide a treatment process that destroys the contaminants volatilized and removed from soils and sludges.

The process and apparatus is preferably adapted to being transportable to a treatment site, and as such able to operate independently of fixed utilities.

SUMMARY OF THE INVENTION

In a broad embodiment of the process according to the present invention, chemical contaminants are separated from inert materials such as soils and/or sludges by a process comprising subjecting inert materials contaminated with chemical compounds to a temperature effective to volatilize the contaminants but below incineration temperature, with continuous removal, condensation and collection of the evolved vapors, for a period of time sufficient to effect the desired degree of decontamination of the inert material.

Accordingly, a broad embodiment is directed to a method for separating chemical contaminants from contaminated feed materials comprising, subjecting the feed materials contaminated with chemical compounds to a temperature effective to volatize the contaminants, but below incineration temperature, with continuous removal of evolved vapors comprising chemically oxidizable compounds, for a period of time sufficient to effect a desired degree of separation of the contaminants from the feed materials.

Another embodiment of the invention provides a process for separating chemical contaminants from contaminated feed materials comprising, subjecting the feed materials contaminated with chemical compounds to a temperature effective to volatize the contaminants, but below incineration temperature, with continuous removal of evolved vapors comprising chemically oxidizable compounds, for a period of time sufficient to effect a desired degree of separation of the contaminants from the feed materials, wherein the evolved vapors are catalytically oxidized in the presence of steam, at gas phase conditions to convert substantially all of the chemically oxidizable compounds, thereby producing a gaseous reaction product comprising substantially steam and incondensable gases.

When applying the inventive process to decontaminate a large amount of material, the process is preferably carried out with an indirectly heated airtight dryer. Indirect heating does not involve injection of air into the dryer, thus the problem of venting contaminated combustion exhaust gases is avoided. The drying process is usually carried out under a slight vacuum, so that there can be no significant problem of emission into the atmosphere of any pollutants.

Temperatures are carefully controlled to keep the average solids temperature of the material being processed below 425° C., and for greater economy more usually below 325° C., so that there is no problem of formation of dioxins or dibenzofurans. At these temperatures the volatile component of the contaminated material vaporizes to form a gas phase, leaving behind an inert solid phase. The gaseous phase, which may contain fine solid particles, steam, air, an inert carrier gas, and vaporized contaminants such as VOC's and PCB's, is continuously drawn off from the dryer and is subsequently condensed and collected for further treatment or catalytically oxidized to form steam and inert gases.

These as well as other embodiments of the present invention will become evident from the following, more detailed description of certain preferred embodiments.

BRIEF DESCRIPTION OF THE DRAWINGS

The process and apparatus in accordance with the present invention will be described with reference to the accompanying drawings, in which.

DETAILED DESCRIPTION OF PREFERRED EMBODIMENTS

Figure 1:
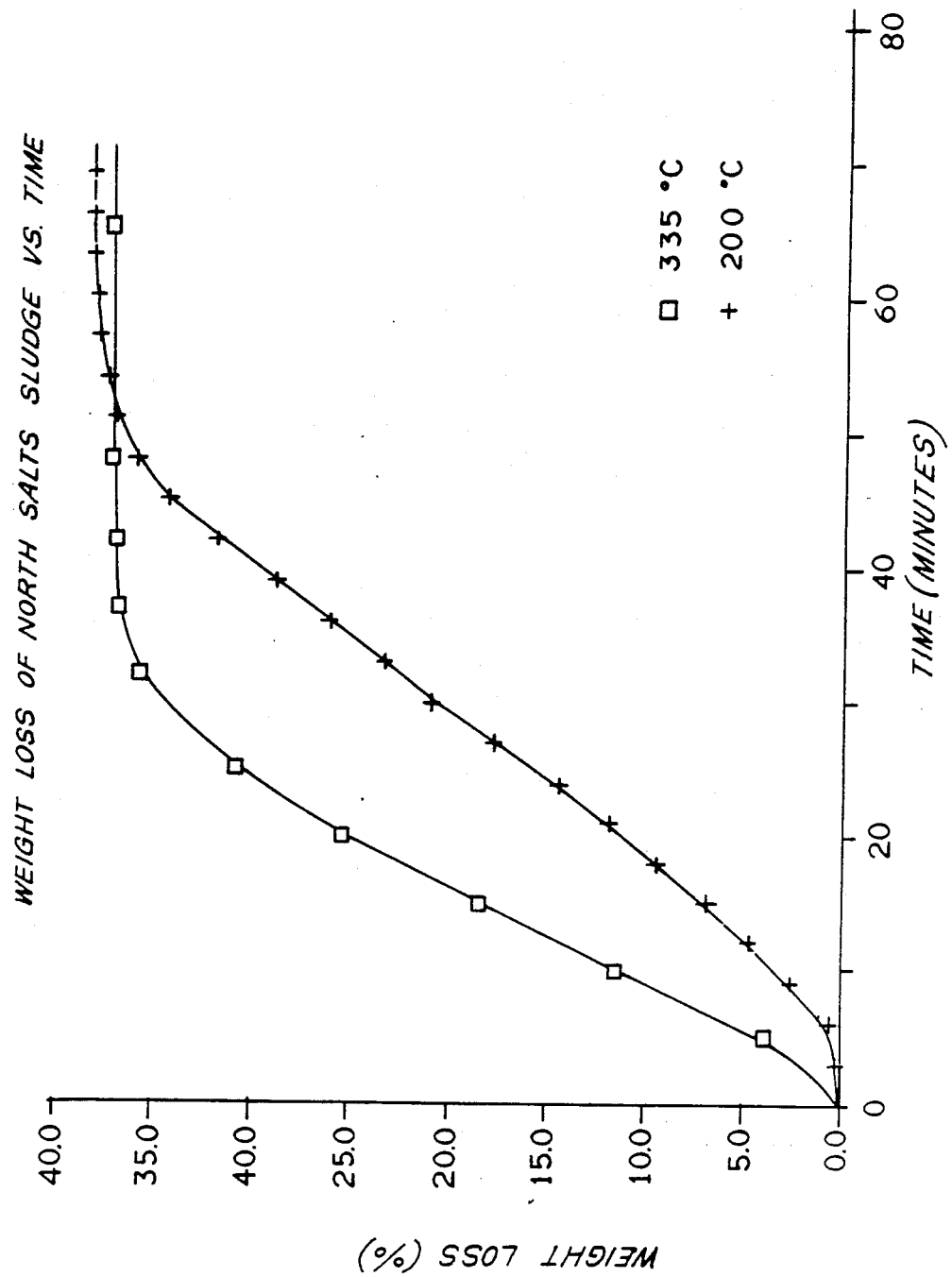
FIG. 1 shows typical curves of weight loss versus time for several runs with North Salts sludge at various temperatures.

Many types of contaminated inert materials, such as soil, sand, sludge and hazardous wastes such as contaminated pond sludges, filter cakes, etc., can successfully be treated in accordance with the present invention. The contaminated materials to be treated may collectively be referred to hereafter as "feed". The term "solids" and "feed" are used interchangeably and refer to any pumpable or non-pumpable contaminated materials comprising at least 30 wt % solids, more preferably 50 wt % solids. The removal of contaminants by thermal evolution of vapor may be referred to as "drying". Contaminated feeds are obtained from a variety of sources including soil contaminated by chemical spills and industrial discharges, solids from clarifiers and thickeners, sludges from waste holding tanks and treatment ponds, and solids from filtration processes.

The process has been found to be effective for the broad variety of chemical contaminants and concentrations that are encountered in the chemical waste treatment business. As used herein, "contaminants" includes both organic and inorganic chemical compounds. While it would not be possible to list every contaminant to which the presently claimed thermal separation process may be applied, examples of contaminants that are likely to be present in the feed are polychlorinated aromatic compounds, and organic solvents. PCB's and pentachlorophenols (PCP's) are two exemplary organic compounds that may be thermally separated according to the present invention. The inventive treatment process has been shown effective in separating organic compounds whose vapor pressures (at 5° C.) ranges from 0.000001 to over 300 mm Hg. The process is capable of treating feeds with contamination levels ranging from 1 wt ppm to 20 wt % of the feed charge, with a more preferred contamination level of less than 5 wt %.

While it has been the belief of skilled workers in the art that thermal sanitizing of inert materials requires heating the materials to incineration temperatures to cause decomposition of the halogenated organic contaminants, the present invention is based on the surprising discovery that it is possible at low temperatures (preferably less than 325° C.) to successfully sanitize a broad variety of inert materials. It is surprising that substantially complete removal of organic contaminants, including high boiling compounds, from a variety of inert materials can be effected at temperatures substantially lower than their boiling points and incineration temperatures.

During laboratory testing of the inventive process using bench scale equipment, it has been demonstrated that organic contaminants can be removed from soil/sludge by heating to a temperature of below 425° C., and for greater economy, preferably below 325° C. In one test, pond sludge containing nearly 1000 ppm PCB was heated at 300° C. for about one hour in air, whereupon the PCB concentration was reduced to less than 2 ppm. Heating contaminated soil/sludge in a once through nitrogen atmosphere has similarly demonstrated the efficacy of the technique.

The mechanism by which complex materials are dried so that substantially complete removal of contaminants from inert materials occurs is complex and not completely understood. It is believed that the phenomena involved basically follow those disclosed in the *Physical Chemists Handbook*, Section 21, which is incorporated herein by reference. The structure of the solids in the feed, the type of liquid contaminants and other liquids in the feed, the concentration of liquids, and the saturation of the gas phase determine the mechanism by which internal liquid flow and vaporization may occur. Liquid flow mechanisms can include (1) diffusion, (2) capillary flow, (3) flow caused by shrinkage and pressure gradients, (4) flow caused by gravity and (5) flow caused by vaporization-condensation sequence.

Drying of feeds wherein the solids are of a complex structure and texture does no occur as a single continuous process but involves a number of distinct phases. A first phase in drying contaminated inert materials involves evaporation of liquids, which may be contaminants, water, or other liquids, from the saturated surface on the solid. This is followed in turn by a period of evaporation from a saturated surface of gradually decreasing area and, finally, when the surface of the solids in the feed is no longer saturated, to a period of evaporation from the interior of the solids.

The drying rate accordingly varies with temperature, time, solids composition, and moisture content. In a plot comparing vapor evolution versus time, distinct phases may be recognized. There is usually a first phase of gradually increasing evolution of vapors as the feed warms up. A second phase, known as the constant-rate phase, corresponds to the period in which a constant amount of vapor is evolved. The constant-rate phase continues until a point at which the rate of drying begins to fall, known as the point at which the "critical-moisture" content point is reached. After reaching the critical-moisture content point, the next phase is called the falling-rate phase. This phase is typified by a continuously changing rate throughout the remainder of the drying cycle, corresponding to the decrease in saturated surface area. A next point in the curve occurs at that point at which all the exposed surfaces become completely unsaturated and marks the start of the portion of the drying cycle during which the rate of internal moisture movement controls the drying rate.

Generally, the drying rate depends on factors affecting the diffusion of moisture away from the evaporating surface and those affecting the rate of internal moisture movement. Moisture which is held in the interstices of solids, or held as liquid on the surface, or is held as free moisture in cell cavities moves by gravity and capillary flow, provided that passageways for continuous flow are present. Moisture may move by vapor diffusion through the feed, provided that a temperature gradient is established by heating, thus creating a vapor-pressure gradient. Vaporization and vapor diffusion may occur in any feed in which heating takes place from one direction drying from the other and in which liquid is isolated between or inside granules of solid.

In the terminal phase, the drying rate is governed by the rate of internal moisture movement; the influence of external variables diminishes. This period usually predominates in determining the overall drying time to lower moisture content.

If the process according to the present invention is carried out in a continuous process, it will be understood that all of the above processes are occurring at the same time. It will also be understood that operating parameters may be varied to influence the above phenomena. For example, an additional inert gas may be passed over the drying feed to remove evolved vapors. In this way, the concentration of evolved vapors in the gas phase around the drying solids is lowered, and it becomes easier for the heated liquids to pass from the liquid phase into the vapor phase.

It is also the experience of the inventors that the presence of a small amount of water in the feed improves the effectiveness of the overall decontamination process. It is believed that as water in the interstitial spaces in the inert materials vaporizes and goes into the vapor phase, it carries contaminants along with it or otherwise facilitates the vaporization of the contaminants, i.e., by conditioning the gas phase to lower the vapor pressure at which the contaminants will pass into the vapor phase. Even though the largest portion of water present in the feed vaporizes at around the boiling point of water, some water nevertheless goes into the vapor phases together with low boiling organics, and sufficient residual water remains to be vaporized even in the feed that has been heated to a temperature above the boiling point of water, so that water is believed to play a significant role in increasing effectiveness of decontamination throughout a very broad range of temperatures.

In a broad embodiment of the process according to the present invention, contaminants are separated from inert materials such as soils and/or sludges by a process comprising subjecting the contaminated inert materials to a temperature effective to volatilize the contaminants but well below incineration temperature, with continuous removal of the evolved vapors, for a period of time sufficient to effect the desired degree of decontamination of the inert material.

The drying process of the present invention may be carried out using any known indirect or infrared/radiant-heat drying process where the feed to be dried is static, moving, fluidized, or dilute. Either batch or continuous drying equipment may be used, including but not limited to, cylinder, drum, screw-conveyor, steam-tube rotary, vibrating tray, agitated-pan, freeze, vacuum rotary and vacuum-tray dryers. When applying the inventive process to decontaminate a large amount of material, the process is preferably carried out with an indirectly heated airtigh rotary dryer. If the process is carried out using a screw-conveyor dryer it is preferred that the dryer operate at a slight vacuum and that the screw flights be indirectly heated using a heat transfer medium such as hot oil. Solids temperatures are carefully maintained below 425° C., and for greater economy more usually below 325° C. At this temperature the volatile component of the contaminated material vaporizes to form a gas phase, leaving behind an inert solid phase. The gaseous phase, alternatively referred to as the evolved vapors, which may contain steam, air, an inert carrier gas, and vaporized contaminants such as VOC's and PCB's, is continuously drawn off from the dryer and condensed and collected for further treatment or be catalytically oxidized to destroy the volatilized contaminants.

The specific operating parameters will vary depending on degree of wetness of the feed, the concentration and boiling point(s) of contaminant(s) in the feed (which can vary over a wide range), and the percentage of the contaminants to be removed from the feed. This system may be operated to remove virtually all VOC's and to render the treated feed environmentally safe by EPA standards, or to the levels determined by specific job sites and requirements. For example, as shown above, PCB's can be reduced to less than 2 ppm or as required.

Accordingly, drying temperatures and dryer residence times may vary widely. However, the maximum average solids temperature should not exceed 425° C. Feed at a temperature of 425° C. may typically have a residence time of up to 90 minutes. As used herein, "residence time" is defined as the time the feed is at a specified temperature. Solids can be held longer at the operable temperature if required, although an increase in residence time will reduce the capacity of the system.

While it is possible that solids may exit the dryer at temperatures up to 425° C. in some cases, it is more usual to have the solids exit at a temperature of from 225° to 325° C. Since the halogenated organic contaminants are not subject to temperatures above 325–425° C. there will be no undesirable chemical changes to original constituents. Of great advantage is the fact that there will be no incidental creation of dioxin from halogenated hydrocarbons as presently occurs in incineration techniques. However, the presence of dioxin in the feed does not disturb the operation of the present invention.

The dryer has an operating pressure of from about 2 to about −10 inches water column (gauge). Preferably the dryer operates at a very slight vacuum (typically from about 0 to about −10 inches water column (gauge)) to ensure that if the system is not positively airtight, any leakage that might occur will draw air into the system, and not the reverse. This should prevent any environmental emissions.

A minimum gas velocity (typically 0.5 to 2.0 foot per second) should be maintained in the dryer to assure adequate vapor removal from the solids.

Water or steam may also be positively employed in the inventive process to help strip contaminants from the interstitial spaces. It is believed that as water volatilizes within and around the interstitial spaces it helps volatilize or strip organics, and that the flow of steam entrains and helps carry organics out the dryer in the effluent gas stream.

Inert gas other than steam is preferably introduced into the system for additional stripping efficiency, preferably in a countercurrent flow through the dryer (i.e., in a direction opposite to the progress of the inert materials).

The inert gas carrier is used in the process primarily for safety to eliminate the risk of a fire in the dryer and to reduce the partial pressure of the overall atmosphere to more easily distill or boil off VOC contaminants. Nitrogen is preferably used for reasons of convenience and practicality. However, other inert gases such as, but not limited to, carbon dioxide, helium and argon, could also be used subject to price considerations, availability and composition of the feed material being processed.

The gas phase, alternatively referred to as the evolved vapors, that is formed as the contaminants are removed from the contaminated soils or sludge in the dryer, comprises inert gases, water vapor, and chemically oxidizable volatile contaminants. The evolved vapors are contacted with a solid catalyst in a reaction zone maintained at oxidation reaction conditions. The chemically oxidizable volatile contaminants in the evolved vapors that were volatilized in the dryer step are oxidized to produce a gaseous reaction product comprising substantially steam and incondensable gases, primarily carbon dioxide and nitrogen. In some instances it may be desirable to subject the gas phase to the wet oxidation reaction after condensable materials have been removed.

Although not completely understood and not wishing to be bound by a particular theory, it is believed that the presence of steam in the oxidation reactor is beneficial to achieving complete oxidation of volatile organic contaminants. It is believed that the steam directly participates in the oxidation of the contaminants either by reacting catalytically, thermally, or by reacting with partially oxidized compounds. This theory of direct steam participation in contaminant removal could also help explain the apparent lack of an oxygen effect since steam is so overwhelmingly present.

Prior to the oxidation step the evolved vapors may be compressed by mechanical means or by a steam jet to increase the latent heat value of the evolved vapors. Likewise, the gaseous reaction product from the oxidation step may be compressed, in preference to the compression of the evolved vapors, to increase its latent heat value. In either case the latent heat can be used to provide the partial or total heat requirement needed in the drying step.

The catalytic wet oxidation is performed in a reactor at gas phase conditions using a solid catalyst. The oxidation reaction conditions include a reaction temperature in the range of from about 204° C. (400° F.) to about 1200° C. (2192° F.). Most preferably the reaction temperature should be maintained in the range from about 371° C. (700° F.) to about 677° C. (1250° F.). The gas space velocity of the evolved vapors in the reaction zone is from about 0.1 sec$^{-1}$ to about 1000 sec$^{-1}$, most preferably from about 5 sec$^{-1}$ to about 100 sec$^{-1}$. The reaction zone pressure preferably is in the operating range of from subatmospheric to about 790 kPa (abs) (100 psig), with a most preferred operating pressure of from about atmospheric to about 446 kPa (abs) (50 psig). The chemically oxidizable compounds in the evolved vapors are catalytically oxidized in the presence of steam generated during the drying step.

The solid catalyst used in the oxidation zone may be selected from any of the known commercially existing oxidation catalyst compositions, or mixtures of known oxidation catalysts, that meet the required standards for stability and activity and that possess a high selectivity for oxidation of volatile organic and inorganic compounds. The active component of the oxidation catalysts is a metal, preferably a nonprecious metal, supported on a solid carrier. The preferred solid carrier is alumina, however, any known carriers may be used, for example, silica, silica-alumina, clay or like materials. The carrier may be in the form of spheres, pellets or extrudates. The amount of active metal on the catalyst is preferably from about 5 to about 50 weight percent, based on the total catalyst weight. More preferably the metal component comprises from about 15 to about 25 weight percent of the catalyst. A preferred oxidation catalyst composition includes chromic oxide and alumina in the form of an extrudate. This preferred catalyst and its method of preparation are more thoroughly described in U.S. Pat. No. 4,330,513 (Hunter et al), which is incorporated herein by reference.

The oxidation reaction of this invention is exothermic and can cause reaction temperatures to increase to excessive levels. To prevent temperatures from exceeding approximately 1200° C. (2192° F.), a quench stream may be added to the oxidation reaction zone. A preferred quench medium is a condensate product obtained from the utilization of the latent heat of the gaseous reaction product. Depending upon the chemical oxygen content of the water rich vapor phase stream and the level of chemically oxidizable compounds to be reacted, it may be necessary to supply additional chemical oxygen as a reactant to achieve the high level of conversion required in the oxidation reaction. Additional chemical oxygen can be supplied by any known means, with the injection of air, oxygen enriched air, or $O_2$ being preferred. On initial start-up of the oxidation reactor it may be necessary to use an external heat source to increase the temperature of the reactants to a point where the oxidation reaction will begin. To maintain the appropriate inlet reactor temperature of the reactants during the process it may be necessary to perform indirect heat exchange of the reactants with a portion of the reaction products.

The oxidation reaction step of the invention is capable of catalytically oxidizing a wide range of volatile organic and inorganic compounds, including halogenated organics, organosulfur compounds and organonitrogen compounds. The gaseous reaction product obtained from the oxidation of such compounds may be highly acidic, containing HCl, $SO_x$ and $NO_x$. The acidic nature of the product can have deleterious effects on downstream equipment metallurgy. Neutralization of the acidic gaseous reaction products can prevent corrosion and the eventual destruction of downstream equipment. Any neutralization process known to the art may be used to neutralize the acidic reaction products. A preferred neutralization method involves the use of a limestone bed located immediately downstream of the oxidation reactor. The inherent alkalinity of limestone will neutralize and remove any acidic gases contained in the gaseous reaction stream. Depending upon the amount of acidic gas present, multiple limestone beds arranged in series flow may be employed. A preferred type of limestone is dolomitic limestone, which contains a carbonate of calcium and magnesium. The magnesium is better suited to capture volatilized borates and arsenates.

Although oxidation of the chemically oxidizable compounds in the water rich vapor phase stream is preferably performed using a solid supported metal catalyst, it is within the scope of the invention to perform the oxidation step by any catalytic means or combination of means known to the art. For example, the oxidation reaction may be performed by ultraviolet light catalyzed peroxide or ozone oxidation.

The composition of the gaseous reaction product exiting from the oxidation reactor comprises substantially steam and incondensable gases, primarily carbon dioxide and $N_2$. The gaseous reaction product can optionally be condensed to produce a useful condensate of substantially liquid water. Condensation can be performed by any method known to the art. One method is to pass the gaseous reaction product through an economizer to utilize its latent heat to supply the heating requirements of the drying step. When the hot gaseous oxidation reaction product is condensed, a condensate product stream is produced comprising substantially liquid water that is free of minerals and organics and is reusable as a condensate for other processes or the condensate may be directly disposed of to existing surface water receiving streams without the need for additional treatment.

A more complete understanding of the inventive concept of this invention may be obtained by a review of the accompanying figures, which present four preferred embodiments of the invention. The presentation of these embodiments is not intended to exclude from the scope of the inventive concept those other embodiments set out herein or other reasonable and normal modifications of the inventive concept. Details, such as miscellaneous pumps, heaters, and coolers, condensers, start-up lines, valving, and similar hardware, have been omitted as being nonessential to a clear understanding of the preferred embodiments of the invention. It will also become apparent that the apparatus and conditions may be varied widely while retaining the basic principles of the present invention. The examples are to be considered illustrative, and are not in any way restrictive.

BENCH SCALE EXAMPLES

Sludge samples from two impoundments in New York were used: the first being North Salts sludge, the other Lagoon 2 sludge. Approximately 75 g of North Salts sludge or 95 g of Lagoon 2 sludge were used for each experiment. The sludge was stirred to form a homogeneous mixture. The mixture was spread (smeared) with a spatula to form a 12 mm thick layer inside an aluminum disk (75 mm dia.×18 mm deep). The dish was placed on a metal platform inside a muffle furnace (Thermolyne Model 1400), which had been preheated to the temperature shown on FIGS. 1 and 2. The platform was connected by a metal rod that passed through a hole in the bottom of the furnace to a disk resting on a top-loading electronic balance. Weight changes of as little as 0.1 gram could be read.

Sample temperature was monitored by means of a 0.020-inch diameter stainless steel-sheathed chromel-alumel thermocouple inserted into the soft sludge. The other end of the thermocouple passed through a small hole adjacent to the furnace door and was connected to either a direct-reading thermometer or millivolt strip recorder. Furnace temperature was read with another chromelalemmal thermocouple and controlled with a built-in percentage input device. While the sample was being heated, air was drawn through the furnace at a rate of about 0.5 liter/minute via glass tubing extending through a ¼-inch diameter hole drilled in the side of the furnace. The air then passed through a water-cooled Friedrichs condenser into a roundbottom flask (to collect condensates) and then through a waterfilled gas scrubber. Despite the air flow, vapors and water condensate did escape around the loosely fitting furnace door.

Residues at the end of each experiment were friable and easily powdered with a mortar and pestle. In the case of the Lagoon 2 residues, pebbles were present but were removed by screening the powder through a 1 mm sieve. The product was reweighed so that results could be calculated on a pebblefree basis.

Experimental Results

Figure 2:
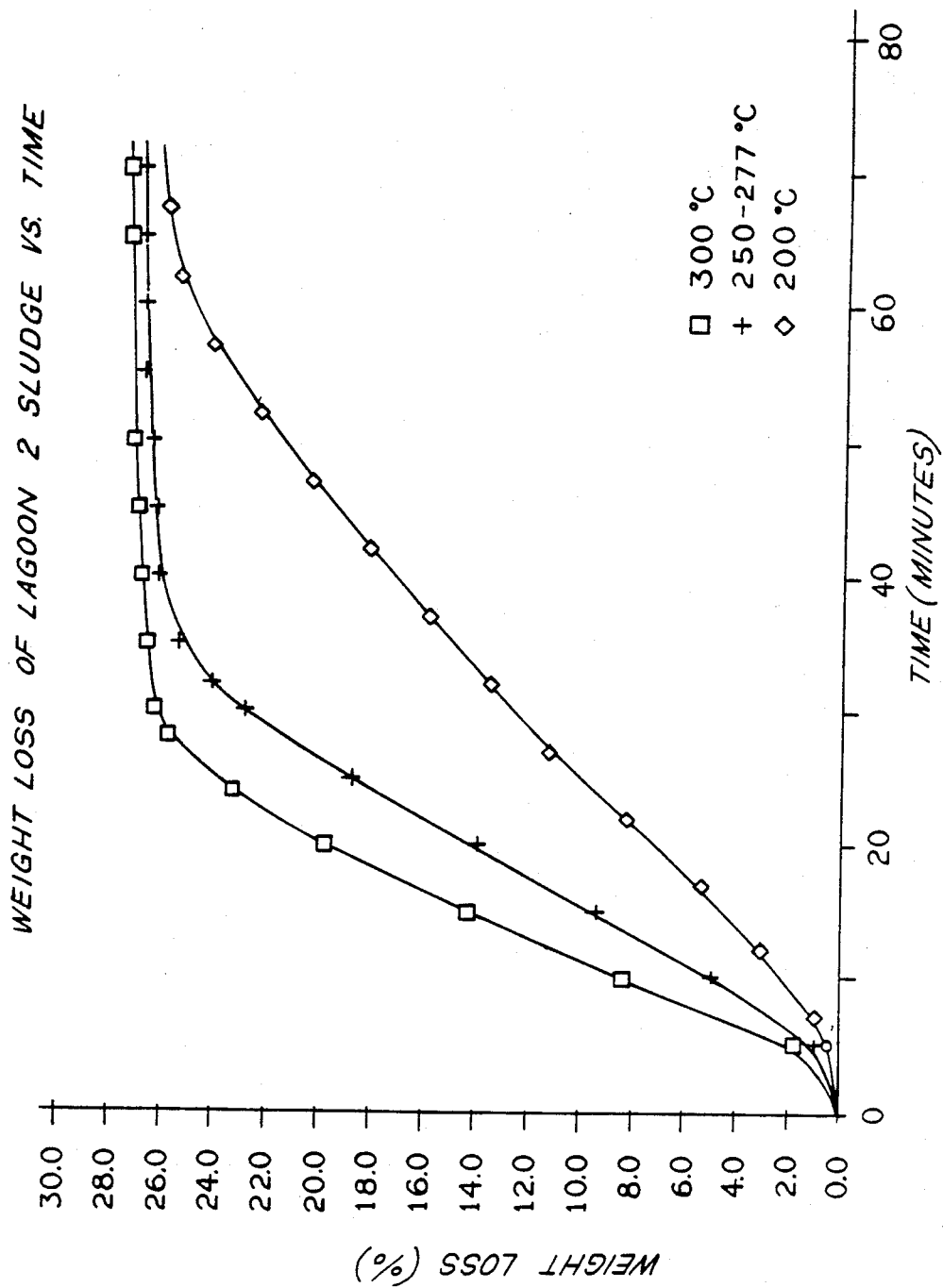
FIG. 2 shows typical curves of weight loss versus time for several runs with Lagoon 2 sludge at various temperatures.

FIGS. 1 and 2 show typical curves of weight loss versus time for several runs with both and North Salts and Lagoon 2 sludges. Only the initial 70 minutes are graphed since subsequent weight changes were almost negligible. The weight changes have been normalized to show grams lost per 100 g of sample, i.e., percent weight loss. It can be seen that the weight loss (or water content) of the North Salts sludge is about 10% greater than that of the Lagoon 2 sludge.

It should be noted that the rates at which sludge samples were heated and water was evaporated are functions of the experimental set-up. They depend on the initial sample weights, sample geometry, sample container, power input and heat capacity of the (relatively small) furnace, airflow, etc. Thus, under the particular experimental conditions, it took about 65–75 minutes for the sample to reach 200° C.; about 45–50 additional minutes to reach 250° or 300° C.; and about 35 additional minutes to reach 335° C. Observations of sample temperature versus time showed that water was evaporated at about 100° C. for periods ranging from about 10–30 minutes, depending on experimental conditions.

Tables 1 and 2 list the weight loss and PCB content after various heating cycles of the North Salts and Lagoon 2 sludges.

TABLE 1

Volatilization Of PCBs From North Salts Sludge

| HEAT TREATMENT | | WEIGHT LOSS | TOTAL PCBs |
|---|---|---|---|
| Temp., °C. | TIME, hr | % | ppm |
| 100 | 2.5 | 35 | 68* |
| 100 | 2.5 | 35 | 76* |
| 200 | 6 | 38 | 3.6 |
| 200 | 16 | 38 | 4.6 |
| 335 | 6 | 38 | <1 |
| 335 | 16 | 38 | <1 |

*Approximately 3.7/1 ratio of Aroclors 1242/1260.

TABLE 2

Volatilization Of PCBs From Lagoon 2 Sludge

| HEAT TREATMENT | | WEIGHT LOSS | TOTAL PCBs |
|---|---|---|---|
| Temp., °C. | Time, hr | % | ppm |
| 90–95 | 3.7 | 25.4 | 984* |
| 200 | 1 | 26.1 | 627 |
| 250–277 | 1 | 26.7 | 120 |
| 300 | 0.25 | 26.7 | 48 |
| 305 | 0.5 | 26.5 | 44 |
| 300–340 | 1 | 28.0 | <1 |
| 300 | 2 | 27.4 | <5 |
| 300 | 4 | 27.6 | <5 |
| 300–340 | 6.3 | 27.4 | <1 |
| 375 | 1 | 28.4 | <1 |

*Approximately 6.6/1 ratio of Aroclors 1242/1260.

Measurement of PCB remaining after treatment at 90°–100° C. served as baseline measurement of PCB contamination in the starting compositions. Analysis for PCBs in the dried, powdered analytical samples—by overnight Soxhlet extraction with 90% hexane-10% acetone and gas chromatographic analysis of the concentrated extract—gave more consistent results than direct extraction of the original watercontaining sludge. At 100° C., not more than one or two tenths percent of the PCBs are volatilized over 2 to 4 hours. Thus, PCB removal was based on comparisons of the dried, water-free residues. The small differences in percent weight loss (due to water) for each series of experiments, though probably real, was ignored for the purposes of the comparisons.

The North Salts sludge was tested first. Only 5 to 6% of the original 72 ppm (average) PCB concentration remained after heating at 200° C. for 6 to 16 hours. At the higher temperature of 335° C., the lower limit of PCB detection was reached, indicating that less than 1 ppm (about 1% of initial PCB) was left after 6 hours. A sludge with greater initial PCB content was needed to verify these apparently successful decontaminations. The Lagoon 2 sludge served this purpose.

Table 2 shows that Lagoon 2 sludge contained 984 ppm PCBs on a waterfree basis. One hour's heating at 200°, 250° to 277°, or 300° to 340° C. volatilized successively larger amounts of PCBs, leaving 64, 12, and less than 0.1%, respectively, of the original PCB content. However, with shorter heating periods of 15 and 30 minutes at about 300° C., approximately 5% of the PCBs were not volatilized. Acceptable PCB removal apparently occurs after one hour at 300° C. The remaining experiments at longer heating intervals or at 375° C. gave further evidence that it is feasible at moderate temperatures to reduce PCB concentration in sludges to less than 2 ppm.

Conclusions

These experiments demonstrate that a simple heating at about 300° C. in air can decontaminate the test sludges so as to leave residues with 2 ppm or less PCBs. A cost comparison based on these sludges shows that cost savings with drying over incineration average $50 to $125/ton, and based on feed composition may be $140/ton or more.

EXAMPLE 2

To demonstrate the effectiveness of catalytic oxidation of volatile chemically oxidizable pollutants, laboratory test runs were performed in accordance with the oxidation process of the invention. A laboratory continuous oxidation unit was used employing toluene as a surrogate volatile pollutant. The catalyst used comprised chromic oxide on an alumina support. Steam, oxygen and toluene were fed at a pressure of about 25 psig to a singlepass reactor containing the catalyst. The gaseous reaction products were condensed and sampled by gas chromatograph.

The toluene feed rate was set to achieve 500 ppm in steam on a volume basis and the oxygen was added to achieve 2% by volume of steam. The catalyst volume was varied to examine the effect of varying the gas space velocity. Table 3 contains a summary of test data results.

Test run results in Table 3 clearly show that the oxidation of toluene (i.e., removal efficiency) was greater than 95% in all cases. Further, the gas space velocity, in the range tested, did not significantly affect the removal efficiency.

TABLE 3

| | Runs Using Toluene as Surrogate Pollutant | | | | |
|---|---|---|---|---|---|
| Runs | Preheat Temp. Celsius | Reactor Temp. Celsius | Space Velocity per sec. | Toluene out (ppm) | Removal Efficiency (%) |
| 1 | 317 | 362 | 9.2 | 18.82 | 96.24 |
| 2 | 318 | 369 | 9.3 | 10.97 | 97.81 |
| 6 | 373 | 419 | 10.0 | 7.20 | 98.56 |
| 7 | 373 | 424 | 10.1 | 5.10 | 98.98 |
| 3 | 432 | 482 | 11.0 | 1.58 | 99.68 |
| 4 | 432 | 487 | 11.0 | 1.17 | 99.77 |
| 12 | 427 | 479 | 7.3 | 1.52 | 99.70 |
| 13 | 427 | 479 | 7.3 | 1.61 | 99.68 |
| 10 | 510 | 563 | 12.1 | 0.73 | 99.85 |
| 11 | 510 | 566 | 12.2 | 0.93 | 99.81 |
| 15 | 510 | 702 | 9.4 | <0.05 | >99.99 |
| 14 | 513 | 702 | 9.4 | <0.05 | >99.99 |

EXAMPLE 3

Test runs were performed to evaluate the effect of oxygen concentration on the oxidation process of this invention. The experimental conditions and apparatus used in Example 2 were followed for the test runs of this example with the exception that the oxygen concentration of the stream fed to the reactor was varied. Runs 3 and 4 had $O_2$ concentrations of 2% by volume of steam. Run 5 had 4% by volume and Runs 8 and 9 had 10% by volume. The experimental results presented in Table 4 show complete oxidation of toluene for all $O_2$ concentration levels tested.

TABLE 4

| | Runs Using Toluene Surrogate Pollutant | | | | |
|---|---|---|---|---|---|
| Run | Preheat Temp. Celsius | Reactor Temp. Celsius | Space Velocity per sec. | Toluene out (ppm) | Removal Efficiency (%) |
| 3 | 432 | 482 | 11.0 | 1.58 | 99.68 |
| 4 | 432 | 487 | 11.0 | 1.17 | 99.77 |
| 5 | 431 | 483 | 11.2 | 1.68 | 99.66 |
| 8 | 427 | 478 | 10.7 | 0.96 | 99.81 |
| 9 | 429 | 481 | 10.7 | 1.10 | 99.78 |

EXAMPLE 4

Oxidation of a chlorinated hydrocarbon in accordance with the invention was performed using the experimental procedure of Example 2. The chlorinated hydrocarbon used in Runs 16 and 17 was tetrachloroethylene (TCE). The experimental results in Table 5 show that TCE was removed at a high efficiency.

TABLE 5

| | Runs Using TCE Surrogate Pollutant | | | | |
|---|---|---|---|---|---|
| Run | Preheat Temp. Celsius | Reactor Temp. Celsius | Space Velocity per sec. | TCE out (ppm) | Removal Efficiency (%) |
| 16 | 509 | 677 | 9.2 | 1.12 | 99.78 |
| 17 | 513 | 679 | 9.2 | 0.67 | 99.87 |

EXAMPLE 5

Oxidation of volatile inorganic compounds in accordance with the invention was performed using the experimental procedure of Example 2. The volatile inorganic compound used in Runs 18 and 19 was ammonia, fed to the oxidation reactor as a 28% ammonium hydroxide solution. The experimental results in Table 6 show that ammonia was removed at high efficiency.

TABLE 6

| | Runs Using Ammonia as Surrogate Pollutant | | | | |
|---|---|---|---|---|---|
| Run | Preheat Temp. Celsius | Reactor Temp. Celsius | Space Velocity per sec. | Ammonia out (ppm) | Removal Efficiency (%) |
| 18 | 513 | 677 | 9.2 | 0.12 | 99.98 |
| 19 | 513 | 678 | 9.2 | 0.04 | 99.99 |

EXAMPLE 6

Oxidation of a mixture of pollutants was performed in accordance with the invention to demonstrate that compounds that are known to be more difficult to oxidize are readily oxidizable in the presence of compounds easily oxidized. The experimental procedure of Example 4 was repeated except that 250 and 288 ppm of propane were additionally added to the 500 ppm of TCE to give 750 ppm and 788 ppm total volatile pollutants in Runs 20 and 21, respectively. Ammonia was added in an amount of 750 and 799 ppm to the 500 ppm of TCE to give 1250 and 1299 ppm total pollutants in Runs 22 and 23, respectively. The experimental results are presented in Table 7. The results clearly show that removal efficiency of a more difficult to oxidize compounds, i.e., TCE, is not reduced by the presence of propane or ammonia, which are readily oxidized.

TABLE 7

| | Runs Using TCE Mixed Surrogates | | | | |
|---|---|---|---|---|---|
| Run | Preheat Temp. Celsius | Reactor Temp. Celsius | Space Velocity per sec. | TCE out (ppm) | Removal Efficiency (%) |
| 20 | 510 | 677 | 9.2 | 0.32 | 99.94 |
| 21 | 510 | 677 | 9.2 | 0.46 | 99.91 |
| 22 | 510 | 672 | 9.1 | <0.02 | >99.996 |
| 23 | 510 | 671 | 9.1 | <0.02 | >99.996 |

PROPOSED COMMERCIAL SCALEUP OF PROCESS AND APPARATUS

In order to show how the inventive process may be scaled up for handling greater quantities of contaminants, the inventive process will now be explained with reference to FIGS. 3–7, although it will be understood that the spirit of the presently claimed invention is in no way limited to these illustrative embodiments.

A detailed discussion of equipment specifications and operating conditions for primary and ancillary equipment suitable for constructing and operating an apparatus in accordance with the present invention can be found in Perry & Green, *Perry's Chemical Engineers' Handbook*, 6th Ed., at Section 20 entitled "Solids Drying and Gas-Solid Systems", the text of which is incorporated herein by reference.

Figure 3:
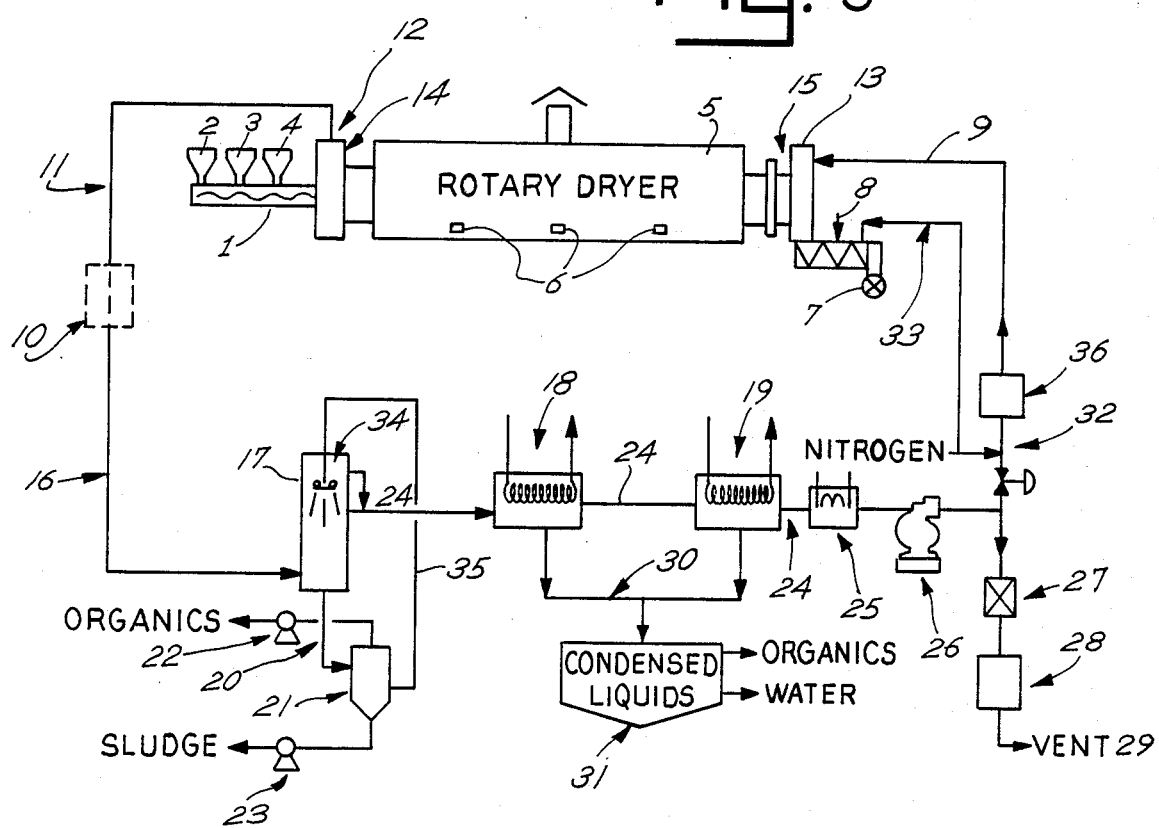
FIG. 3 is a process flow diagram of an exemplary operation that includes recirculation of gas.

A first embodiment, shown in FIG. 3, employs an inert gas recycle system. In FIG. 3 screw conveyor 1 receives feed material from feed material feeder 2. The feed may be preconditioned to improve processibility of the feed. The amount and type of preconditioning depends, for example, upon whether the feed material is wet or dry. If the feed is wet sludge, preconditioning may involve adding detackifiers, such as dried processed effluent solids or sand, in with feed in feed material feeder 2, or by addition of ash or lime (calcium hydroxide) in a controlled manner in the screw conveyor, for example, from ash feeder 3 or lime feeder 4. The action of the screw conveyor is sufficient to blend the conditioners with the feed material.

The addition of lime to the feed material is not believed to play a direct role in the thermal separation process as contemplated by the present invention, but may facilitate a subsequent stabilization for the dried solids. As a secondary consideration, lime may be added to acidic feed materials to protect the dryer from corrosion.

Screw conveyor 1 feeds the feed material into a substantially airtight rotary dryer 5. A detailed description of types of rotary dryers can be found in *Perry's Chemical Engineers' Handbook*, mentioned above. Rotary dryer 5 is preferably at a slight incline so that solids move through the dryer by gravity. In addition, or alternatively, movement of feed may be by means of "flights", i.e., projections inside the rotary dryer shell that mix and move the feed as the shell rotates.

Rotary dryer 5 is indirectly heated by means of externally located heaters, i.e., gas burners 6. The burners heat the outer shell of the rotary dryer. The heat is then conducted by the metal shell of the rotary dryer to the interior of the dryer. Flights also help in heat transfer. The burners are controlled to supply sufficient heat to carry out the process at a desired rate. Sensors inside the rotary dryer measure average temperature so that the maximum solids temperature is maintained at a desired level not to exceed 425° C.

As the feed is exposed to thermal energy inside the rotary dryer, volatile components are vaporized. The longer the feed remains in the dryer, the more complete the drying, and consequently the greater the degree of decontamination of the solids. By the time the dried solids 7 exit the rotary dryer at the exit side, the desired degree of drying and decontamination has occurred. Conditioners may be added to facilitate handling of the dry effluent solids. For example, water spray 8 may be added to reduce the amount of dust and/or cool the effluent.

Direction of gas flow through the dryer is determined by plant setup. That is, if recirculating gas is introduced at the same end of the dryer as the feed, and drawn out of the dryer at the end from which treated solids are removed, gas flow will be in the same direction as average solids flow. On the other hand, if the gas is introduced at the end of the dryer from which treated solids are removed, and removed from the end at which feed is introduced, flow will be countercurrent. As shown in FIG. 3, vapors evolved during heating in the rotary dryer are carried out of rotary dryer 5 by means of piping 11 connected to purge outlet 12 at the dryer inlet side. Piping 9 introduces recirculating stripping gas into rotary dryer via inlet 13 at the dryer outlet side. The average flow of gas in the rotary dryer will be in the direction opposite to the direction of flow of the solids, so that a countercurrent flow is established. However, it will be readily apparent that the gas inlet and outlet connections could be reversed so that the average direction of gas flow will be in the same direction as the flow of solids.

Nitrogen is exemplified as the stripping gas used to assist in carrying away evolved vapors from the heated feed, although it will be understood that the present invention may employ any suitable stripping gas. The stripping gas helps remove vapors from rotary dryer 5 thereby lowering the partial pressure of the organic vapor component in the dryer so that vaporization of organic materials may occur at lower vapor pressure. Nitrogen inlet 32 situated upstream of reheater 36 permits heating of start-up, makeup, or recirculated nitrogen. Stripping gas may also be introduced directly in the rotary dryer or at the treated solids outlet via nitrogen line 33.

Gas is continuously drawn out of the rotary dryer, consequently the pressure in the dryer is subatmospheric. As a result, if seals 14 and 15 are not airtight, air is drawn into the dryer. This negative air flow will insure that no vapors evolved inside the dryer pass into the atmosphere. This feature also eliminates the necessity for absolutely airtight seals.

The gas phase that leaves the rotary dryer may be comprises of air, steam, volatilized organic materials including halogenated organic materials, and fine solid particles. The gas phase passes from rotary dryer 5 through piping 11. Depending on the amount of fines introduced into the gas phase by the feed materials, it may be desirable to treat the gas by passing it through an optional intermediate mechanical fines collection device 10 for removal of entrained fine particulate materials. The treated or untreated gases are then conveyed via pipe 16 to spray tower 17. Condensation occurs as the temperature of the gas is cooled to the saturation/condensation point of the liquids contained therein. Prior to condensation, the gas may be subjected to catalytic oxidation (not shown) to destroy the volatile chemical compounds removed from the contaminated feed in the dryer.

The condensate is drained from spray tower 17 via piping 20 from the bottom of the spray tower to one or more operating separators 21 where the condensate is separated into an oil fraction, a water fraction, and a sludge fraction. The separated out oil fraction is drawn from the separator by means of oil pump 22 and may be pumped, for example, to collection tanks. The separated out water fraction is drawn from the separator by means of water pump 23 and may be pumped, for example, to water collection tanks, or recirculated back to separator 17 via piping 35.

In the spray tower, cooling water introduced into the spray tower at the top portion 34 falls to the bottom portion of the spray tower. Gas introduced into the spray tower near the bottom of the spray tower passes to the top of the spray tower. In this manner the gas contacts water and is simultaneously cooled and scrubbed of most liquids and any remaining inert materials. The scrubbed water carrying the materials stripped from the gas drains from the bottom of the spray tower 17 and is conveyed to a separator 21 by means of piping 20. The liquid in the separator settles to form an organic portion, a water portion and a sludge portion. The water portion may be recirculated back into spray tower 17 by means of piping 35 for reuse as cooling and stripping water. Other gas-solids separation equipment may be used as an alternative to the spray tower. For example, a cyclone spray scrubber, an impingement scrubber, a packed or fluidized bed scrubber, a venturi scrubber, an eductor scrubber, mechanical scurbber, or a water-jet scrubber may be used to accomplish the removal of liquid and inert materials from the gas.

Gas leaving portion 24 of spray tower 17 maybe subject to further cooling and condensation by means of a heat exchanger, i.e., an atmospherically cooled radiator system unit 18, or by means of a refrigeration unit 19, or both. Any residual water or organic material in the gas is condensed in condensers 18 and 19. One, two, or more condensate stages of increasingly lower temperatures may be employed. Condensate is drained and carried by means of piping 30 to condensate storage 31 where the water and organic components are separated. Condensate storage 31 may comprise, for example, settling tanks. The water component may be stored for eventual treatment, or may be recirculated to spray tower 17 for reuse as cooling and stripping water.

Gas that leaves from the top of condenser 19 is comprised primarily of air and nitrogen. This gas passes via piping 24 to reheater 25, then through blower 26. A portion of this gas is directed through particulate solid filter 27 and one or more carbon canisters 28 for filtration and stripping prior to exiting the system by means of gas vent 29. A major portion of gas leaving blower 26 is conveyed through piping 32 and reheated in heater 36 for return to rotary dryer 5 via piping 9.

Figure 4:
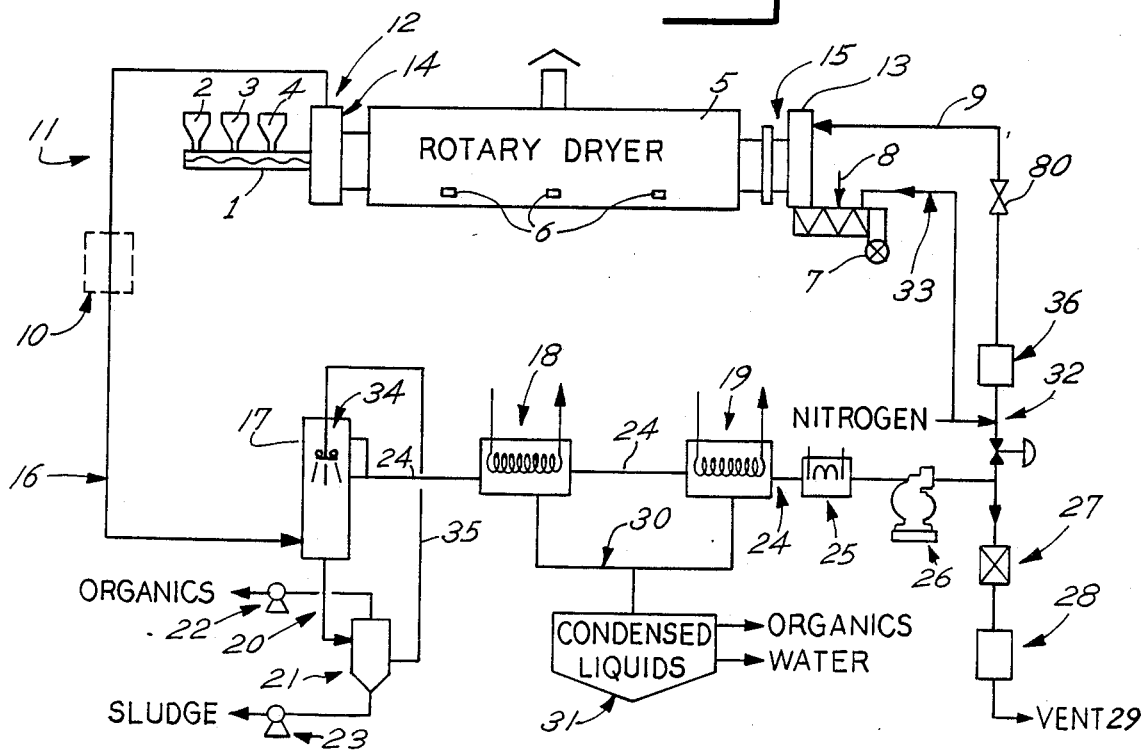
FIG. 4 is a process flow diagram of an exemplary operation without recirculation of gas.

A second embodiment, shown in FIG. 4, is substantially similar to the equipment layout of the embodiment shown in FIG. 3 except for provision of valve 80. Closure of valve 80 results in an embodiment that demonstrates operation without recirculating stripping gas.

Figure 5:
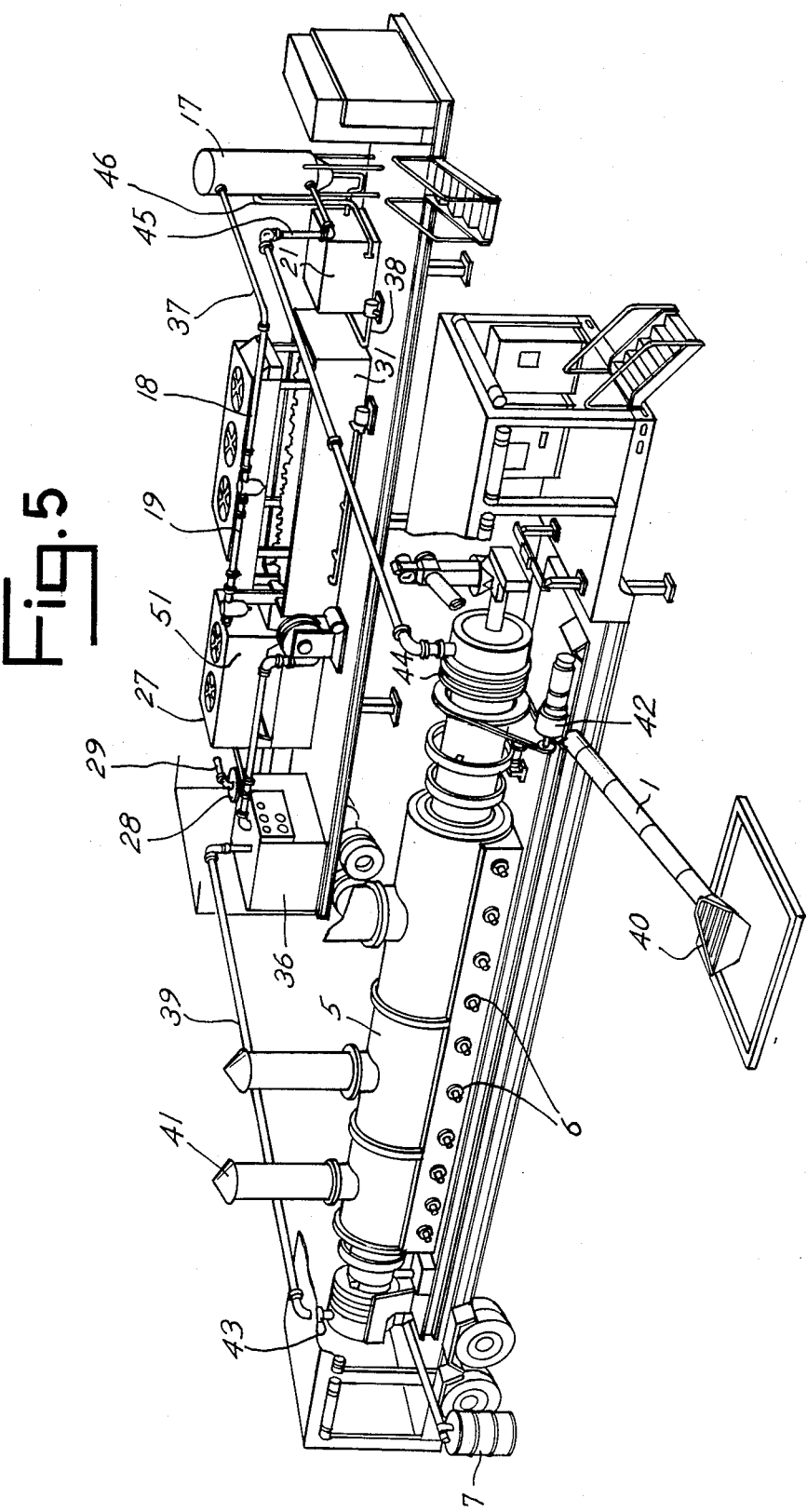
FIG. 5 illustrates a transportable equipment setup showing major components drawn to scale.

To further exemplify and illustrate the present invention, a third embodiment will be described that is completely transportable. The transportable unit shown in FIG. 5 is mounted on two standard 40 foot trailers. Being transportable, the treatment system can be transported to the treatment site and set up substantially as shown in FIG. 5. The capability to treat materials at the treatment site represents a significant improvement in economy in that the cost of transporting large amounts of inert materials from the affected site to a treatment facility such as an incineration facility and back to the treatment site can be avoided.

As shown in FIG. 5, feed to be treated is introduced at feed inlet 40 and conveyed by means of conveyor 1 to rotary dryer 5 at the inlet side. The rotary dryer is indirectly heated by means of gas burners 6 situated outside the shell of the rotary dryer. Exhaust gases exit the system by means of heater exhaust 41. The rotary dryer 5 is rotated by means of motor 42. Solids inside the rotary dryer are conveyed along the axis of the rotary dryer by means of flights inside the rotary dryer, but the trailer may be set at an incline to further facilitate movement of solids toward the exit end.

In the rotary dryer, the thermal energy input causes the temperature of the feed to rise and the liquid component of the feed to volatilize. Stripping gas introduced via gas inlet 43 helps purge rotary dryer 5 of volatilized liquids. The mixture of inert stripping gas, dust, volatilized organic material, steam and air exits rotary dryer 5 through gas exit 44. As a result, average gas flow is maintained along the rotary dryer axis in a direction opposite the direction of the flow of feed, so that a countercurrent flow is maintained. Essentially decontaminated soil leaves the rotary dryer and dryer system at soil exit 7.

Gas leaving the rotary dryer via gas outlet 44 passes through gas handling piping 45 to enter the lower end of spray tower 17. As the gas moves upward in the spray tower to exit through the upper end of the spray tower, it passes through a downward spray of water. The water has the effect of cooling the gas and at the same time stripping the gas of any solid or liquid matter. Water and stripped materials drain from the bottom of the separator to the condensate separator 21. The water phase that separates out in the separator may be recirculated back into spray tower 17 by means of piping 46. The condensate separator 21 may be connected to storage tanks 31 by pipe means 38 for maintenance of water levels in the separator 21 or for start-up.

Scrubbed gas leaving spray tower 17 through piping 37 may pass through one or more heat exchangers/condensers 18 and 19 to further reduce the temperature of the gas and condense any hydrocarbons or water remaining in the gas phase, although operational circumstances such as high or low ambient temperatures may dictate bypassing either the heat exchanger or refrigerated condenser step. Condensate is collected in condensate storage tanks 31 and may pass through pipe 38 to condensate separator 21 for recycling through piping 46 into spray tower 17.

Gas having passed through the desired condensation steps is essentially free of any materials that are liquid or solid at room temperature. A portion of the gas may be discharged to the atmosphere by passing through filter 27, carbon absorption unit 28 and gas outlet 29. Alternatively, the gas can be catalytically oxidized to destroy any remaining volatilized contaminants. Gas to be recycled is preferably preheated in gas heater 36 prior to recirculation through piping 39 back into rotary dryer 5 at gas inlet 43.

While operation of the third exemplary embodiment is explained above without employment of an inert stripping gas such as nitrogen, it is readily apparent that the third embodiment may readily be adapted to employ a stripping gas in the manner of the second embodiment. Such a transportable system using recycling stripping gas will now be explained in great detail as the fourth embodiment. Since the embodiment combines features discussed above in embodiments one through three, no additional figures are considered necessary. The following specific exemplary operating parameters are based on calculations for processing 5 tons per 24 hour day and using nitrogen stripping gas. If desired, the calculations may be scaled up, for example, for processing of up to about 100 tons per day.

In the transportable system the rotary dryer should be capable of heating the feed material to a maximum temperature of 425° C. for a period of not less than 30 minutes.

The transportable system is capable of accepting feed in the form of pumpable sludge or non-pumpable sludges or solids, but the feed should contain no particles larger than about 1.25 inches in diameter. The feed may typically be comprised of from 10 to 50% water, 0.01 to 10% organic contaminants, and 30 to 90% inert solids (soils), and as a typical example may be comprised of about 30% water, 5% mixed organics, and 65% soil. Constitution will vary greatly depending on the particular treatment site. In the following description of operation of the system, wet contaminated soil is feed at a rate of 273 lb/hr of soil on a dry basis, 126 lb/hr of water, 21 lb/hr of hydrocarbons, and 470 lb/hr of nitrogen gas introduced at a temperature of about 0° to 40° C.

The mobile dryer system is effectively closed, with the only material exiting the system being dried solids exiting from the rotary dryer exit at about 325° C. and vent gas. The system is designed to minimize the potential for fire or explosion throughout the system.

The total system is comprised of two major subsystems; namely, the mobile dryer (low temperature calciner) with feed system and controls, and the process vent gas/condensate system with controls. The two subsystems have two major connection points. First, the vapor discharge from the dryer (provided at the soil inlet end of the dryer to attain a countercurrent effect) carries evolved steam, organic contaminants, air and inert gas via piping to the condensate subsystem. Second, piping is provided to recycle inert gas, which in this case is nitrogen, back to the dryer. Prior to return of the gas to the dryer, the gas should be heated to about 225° C. in a reheater.

The dryer operates at a very slight vacuum (from about 0 to about −10 inches water column (gauge)) to assure that any leakage that might occur will draw air into the system and not the reverse. This is to avoid environmental emissions. A minimum gas velocity (typically 0.5 to 2.0 foot per second) is maintained in the dryer to assure adequate vapor removal from the solids.

Steam and organic contaminant vapors evolved in the dryer and inert gas are drawn off into the vent gas/condensate subsystem. The gas stream leaves the dryer subsystem at about 225° C. and may contain varying amounts of particulates, probably less than 200 microns in diameter, depending on the feed material. The gas containing particulate matter may be passed through a fines separator for removal of fines prior to scrubbing.

The gases are subject to three stages of cooling or condensing. In the first stage, hot gases pass through a spray tower where particulates and most of the oil are removed by the scrubbing influence of sprays of water (about 10 gallons per minute of water). The water containing condensed hydrocarbon and particulate matter drains from the spray tower at a temperature of about 80° C., and is pumped or conveyed to an oil and water separator. The water from the oil and water separator is screened and pumped back to the spray tower.

Hot gases leave the spray tower at about 85° C. and are conveyed to a heat exchanger. At this second cooling stage the gas is cooled to about 50° C. The heat exchanger is a radiator system that accepts heat from the gas and radiates it through a radiator to the ambient air.

The gas that leaves the second condenser/cooler stage passes to a refrigerated condenser stage where the temperature of the gas is lowered to about 5° C. A combined total of about 10.5 lb/hr hydrocarbon and 168 lb/hr condensate drain to the oil/water separator from the second and third stages. Gas that is not condensed after the gas temperature has been lowered in the refrigeration step is primarily nitrogen, and more specifically comprises 470 lb/hr nitrogen and 2.4 lb/hr water. After cooling to about 5° C. the entire gas stream is heated to about 30° to 35° C. to prevent condensation in the particulate solid filter, the carbon absorber and downstream piping.

A portion of the nitrogen may be treated and discharged into the atmosphere, and the balance recirculated back to the dryer. In this example 18 lb/hr nitrogen is first filtered to less than 10 microns, then passed through an activated charcoal absorber, prior to being discharged to the atmosphere. The return nitrogen (about 452 lb/hr) is reheated in a reheater to about 225° C. prior to reentering the dryer.

Where practical, existing utilities, such as cooling water or electricity may be used. However, since the system is designed to operate in remote areas, it should preferably be capable of operation using portable electric generators.

Water for start-up, electric generators, and fuel for the burners in the dryer may be carried with the portable dryer system. Any mechanical refrigeration required may be provided for as part of the system. All system components are preferably able to operate in an unprotected environment. The operating ambient temperature range may be 0° C. to 45° C. The system should be easily drained for freeze protection.

The vent gas/condensate system may include all necessary tankage to store aqueous condensate and organic condensate for further processing, and tankage for any cooling water that may be used for condensing the vapor. The collected aqueous condensate may be stored, treated for disposal, or used as cooling water in the spray tower. Provisions may be made to collect 2 days' production of condensate in two or three separate storage tanks, each designed for one day's operation. Except for initial start-up, the transportable system uses condensed water where cooling water is required.

Figure 6:
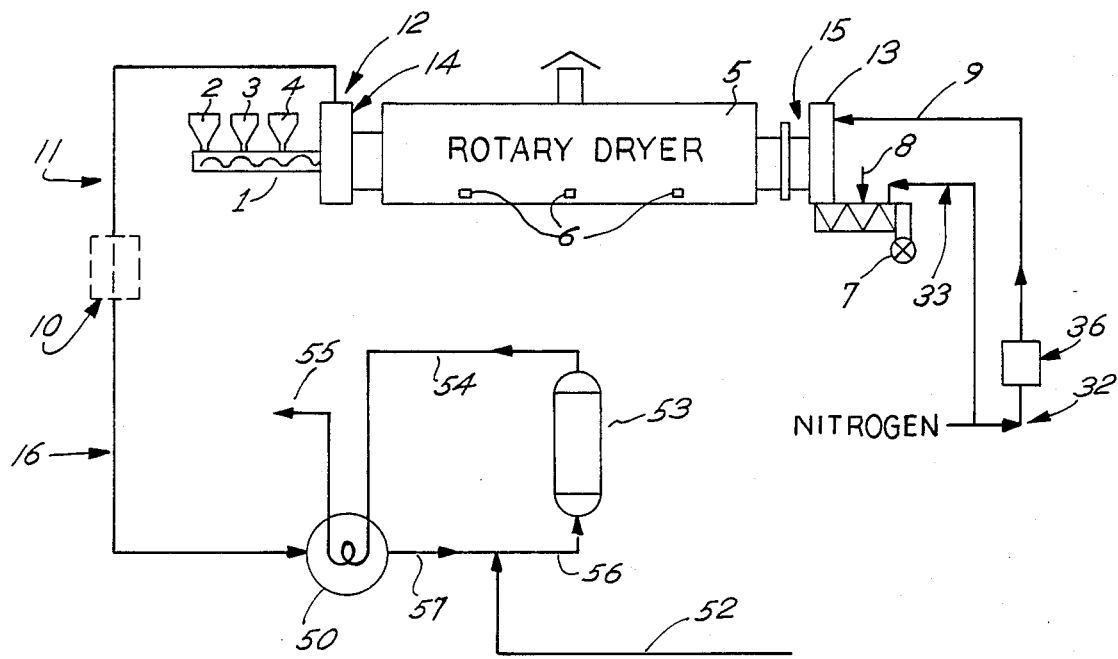
FIG. 6 illustrates a process flow diagram of an exemplary operation where evolved vapors are catalytically oxidized.

FIG. 6 is a flow diagram of one embodiment of the invention where the evolved vapors containing oxidizable chemical compounds are catalytically oxidized. The contaminated feed to be treated is supplied to dryer 5 via line 9. The unit operation of dryer 5 is the same as described above for the embodiment illustrated in FIG. 3. Evolved vapors comprising steam, inert gas, and chemically oxidizable compounds are removed from the dryer via line 11, optionally treated to remove fines in device 10 and are heated in exchanger 50 with gaseous reaction products in line 55. Dried solids substantially free of chemically oxidizable organic contaminants are removed from dryer 5 via line 7. The heated evolved vapors in line 57 are admixed with an oxygen containing stream 52, such as air, to form an admixture of oxygen, inert gas, steam and chemically oxidizable compounds. The admixture in line 56 is contacted with a nonprecious metal oxidation catalyst of the types described above in reactor 53. In some instances, it may be necessary to increase the temperature of the evolved vapors above the temperature obtained from exchanger 50. In order to improve the combustion reaction in reactor 53, it may be necessary to add hydrogen rich organic compounds to stream 56 prior to introduction into reactor 53. The oxidation reaction achieves at least 95% conversion, preferably 99+% conversion, of the chemically oxidizable compounds removed from the dryer. The oxidation reaction produces a gaseous reaction product of substantially steam and incondensable gases, primarily carbon dioxide. The gaseous reaction product is removed from reactor 53 by line 54 and used as in exchanger 50 to preheat the evolved vapors in line 16. The cooled gaseous reaction product in line 55 may then be discharged to the environment or subjected to further treatment.

Figure 7:
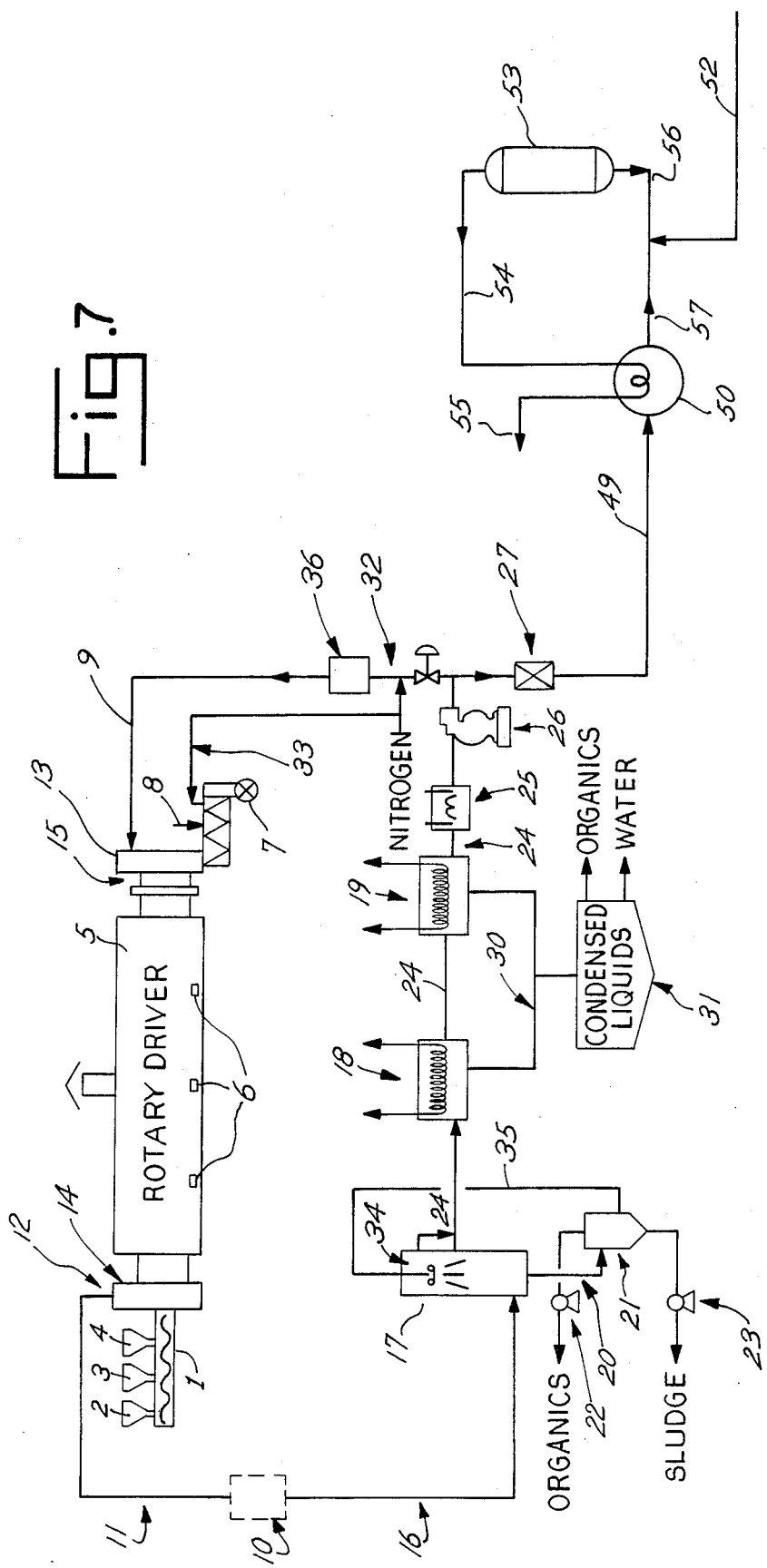
FIG. 7 illustrates a process flow diagram of an exemplary operation where evolved vapors are catalytically oxidized.

A fifth embodiment is shown in FIG. 7 that is substantially similar to the embodiment illustrated in FIG. 3 except for the addition of a catalytic oxidation step after the scrubbing and condensation steps. The catalytic oxidation step eliminates the need to treat the noncondensed gases with carbon. The operation of this embodiment is substantially the same as that described for FIG. 3 except that a portion of the gases exiting blower 26 are directed through particulate solid filter 27 and via line 49 to the catalytic oxidation process described above for FIG. 6.

Variations on the design or operation of the above illustrative embodiments may be readily made to adapt the inventive process to various operational demands, all of which are within the scope and spirit of the present invention.

The present invention has been described in terms of certain preferred embodiments. Of course, numerous other embodiments not specifically described may fall within the spirit or scope of the following claims.

We claim as our invention:

1. A method for separating chemical contaminants from contaminated feed materials comprising, subjecting the feed materials contaminated with chemical compounds to a temperature effective to volatilize the contaminants, but below incineration temperature, with substantially continuous removal of evolved vapors having chemically oxidizable compounds, for a period of time sufficient to effect a desired degree of separation of the contaminants from the feed materials, wherein the evolved vapors are catalytically oxidized in the presence of steam at gas phase conditions, to convert substantially all of the chemically oxidizable compounds, thereby producing a gaseous reaction product comprising substantially steam and incondensable gases.

2. A method for separating organic contaminants from contaminated inert solids comprising, in combination, the steps of:
   (a) subjecting inert solids contaminated with organic contaminants to a temperature effective to form an effluent comprising volatilized organic contaminants for a period of time to effect the desired degree of separation of contaminants, wherein the temperature is below the incineration temperature of the organic contaminants; and
   (b) continuously removing and condensing at least a portion of the effluent, wherein the condensate formed comprises volatilized organic contaminants.

3. A continuous method for separating organic contaminants from contaminated inert solid material comprising, in combination, the steps of:
   (a) subjecting inert solid material contaminated with organic compounds to a heating step comprising continuously feeding the inert solid material into an indirectly heated dryer having a rotating drum such that the temperature of the inert solid material is maintained and controlled at a temperature not exceeding 425° C., thereby causing heating and volitization of the organic compounds;
   (b) rotating the dryer drum to cause the inert solid material to tumble while passing an inert gas through the dryer and the inert solid material to assist in the separation of the organic compounds from the inert solid material;
   (c) continuously removing from the dryer a solids phase substantially free of contaminants and a gas phase comprising the inert gas and volatilized organic compounds; and
   (d) condensing and collecting volatilized organic compounds from the gas phase.

4. The process of claim 1 further characterized in that the evolved vapors are admixed with an oxygen containing stream prior to catalytic oxidation.

5. The process of claim 1 further characterized in that the evolved vapors are contacted with a solid oxidation catalyst at gas phase oxidation conditions.

6. The process of claim 5 further characterized in that the oxidation conditions comprise a reaction temperature from about 371° C. to about 677° C., a gas space velocity from about 5 to about 100 sec$^{-1}$ and a pressure of from about atmospheric to about 446 kPa (abs).

7. The process of claim 5 further characterized in that the solid catalyst comprises an inorganic oxide support containing at least one metal oxide.

8. The process of claim 7 further characterized in that the metal oxide is formed from a nonprecious metal.

9. The process of claim 8 further characterized in that the metal oxide comprises chromium and the inorganic support comprises alumina.

10. A method as in claim 2, wherein the temperature employed to effect volatilization is equal to or below 425° C.

11. A method as in claim 2, wherein the contaminants comprise halogenated organic chemicals.

12. A method as in claim 2, comprising heating the inert solids to at least 325° C. for at least 30 minutes.

13. A method as in claim 2, carried out at a vacuum of from about 0 to about −10 inches water column (gauge).

14. A method as in claim 2, further comprising passing an inert gas other than steam through the inert solids at a minimum velocity of 0.5 to 2.0 foot per second.

15. A method as in claim 14, wherein the inert gas is selected from the group consisting of nitrogen, carbon dioxide, helium and argon.

16. A method as in claim 2, wherein the concentration of contaminants in the treated feed materials after treatment is 25 ppm or less.

17. A method for separating chemical contaminants from contaminated feed materials comprising, subjecting the feed materials contaminated with chemical compounds to a temperature effective to volatilize the contaminants, but below incineration temperature, with substantially continuous removal of evolved vapors having chemically oxidizable compounds, for a period of time sufficient to effect a desired degree of separation of the contaminants from the feed materials, wherein the evolved vapors are catalytically oxidized in the presence of steam, at gas phase conditions to convert substantially all of the chemically oxidizable compounds, thereby producing a gaseous reaction product comprising substantially steam and incondensable gases.

18. A method as in claim 17, wherein the temperature employed to effect volatilization is equal to or below 425° C.

19. A method as in claim 17, wherein the contaminants comprise halogenated organic chemicals.

20. A method as in claim 17, comprising heating the inert solids to at least 325° C. for at least 30 minutes.

21. A method as in claim 17, carried out at a vacuum of from about 0 to about −10 inches water column (gauge).

22. A method as in claim 17, further comprising passing an inert gas other than steam through the inert solids at a minimum velocity of 0.5 to 2.0 foot per second.

23. A method as in claim 22, wherein the inert gas is selected from the group consisting of nitrogen, carbon dioxide, helium and argon.

24. A method as in claim 17, wherein the concentration of contaminants in the treated feed materials after treatment is 25 ppm or less.

25. A continuous method for separating chemical contaminants from contaminated inert solid material comprising, in combination, the steps of:
   (a) substantially continuously feeding inert solid material comprising sludge contaminated with chemical compounds into a rotary dryer heated externally with gas burners, such that the temperature of inert solids is maintained and controlled at a temperature not exceeding 325° C., thereby causing heating and volatization of the contaminants;
   (b) rotating the dryer to cause the inert solid material to tumble while passing an inert gas, derived from a noncombustion source, through the dryer and the inert solid material to assist in the separation of the contaminants from the inert solids;
   (c) substantially continuously removing from the dryer, without internal recirculation of the inert solid material, a solids phase substantially free of contaminants and a gas phase comprising the inert gas, steam and volatilized chemical compounds;
   (d) contacting the gas phase with a solid oxidation catalyst, wherein the volatilized chemical compounds are catalytically oxidized in the presence of steam, at gas phase conditions to convert substantially all of the chemical compounds, thereby producing a gaseous reaction product comprising substantially steam and incondensable gases; and
   (e) condensing and collecting condensable materials in the gaseous reaction product.

* * * * *